United States Patent [19]
Ichikawa et al.

[11] Patent Number: 5,452,034
[45] Date of Patent: Sep. 19, 1995

[54] REGULATED PARALLAX COMPENSATION SYSTEM FOR A CAMERA FINDER

[75] Inventors: Yuichi Ichikawa; Masahiro Hayakawa, both of Tokyo, Japan

[73] Assignee: Asahi Kogaku Kogyo Kabushiki Kaisha, Tokyo, Japan

[21] Appl. No.: 234,103

[22] Filed: Apr. 28, 1994

[30] Foreign Application Priority Data

Apr. 28, 1993 [JP] Japan ................. 5-022676 U

[51] Int. Cl.⁶ ............................................... G03B 13/14
[52] U.S. Cl. ........................................................ 354/221
[58] Field of Search ................. 354/219, 221, 222, 224, 354/225, 164

[56] References Cited

U.S. PATENT DOCUMENTS

| | | | |
|---|---|---|---|
| 4,924,247 | 5/1990 | Suzuki et al. | 354/164 |
| 5,142,312 | 8/1992 | Suzuki et al. | 354/164 |
| 5,216,457 | 6/1993 | Yamaguchi et al. | 354/221 |
| 5,258,792 | 11/1993 | Suzuki et al. | 354/221 |
| 5,345,287 | 9/1994 | Taguchi | 354/221 |

*Primary Examiner*—Michael L. Gellner
*Assistant Examiner*—J. K. Han
*Attorney, Agent, or Firm*—Sandler, Greenblum & Bernstein

[57] ABSTRACT

A parallax compensation system in a camera finder includes a mirror surface mounted to a mounting member. The mounting member is rotatably mounted to a mounting frame having protrusions about which the mounting member rotates such that the mounting member is rotatable about an axis defined on the mirror surface. A cam mechanism is rotatably mounted on a top surface of the mounting frame for regulation of the mounting member to have a predetermined position. An urging member biases the mounting member against the cam mechanism, so that when the cam mechanism is rotated, the mounting member is rotated about its axis according to a cam surface of the cam mechanism. The mounting member is rotated about the axis of the mirror surface to change an optical axis of the same to compensate for parallax.

25 Claims, 4 Drawing Sheets

ID BE MANUFACT...

REGULATED PARALLAX COMPENSATION SYSTEM FOR A CAMERA FINDER

Background Of The Invention

A parallax compensation system for a camera finder which has a rotatable mirror disposed along a finder optical path.

In zoom compact cameras, a finder optical system is seperated from a photographing optical system, and therefore, there may be parallax between the finder optical system and the photographing optical system. Generally, the finder optical system is designed so as not to cause this parallax, at a predetermined angular position of the finder optical system. Then, the optical elements must be precisely arranged at predetermined positions, so that a field of view of the finder coincides with an image field on a film plane of the camera.

In this specification, "parallax compensation" is used to mean that the field of view of the finder is made coincident with the image field in the film plane, during manufacturing.

Even if the optical system is assembled as designed, there may be parallax as a result of errors due to manufacturing tolerances, etc. Accordingly it is necessary to compensate for the parallax, by adjusting the alignment of the finder optical system, prior to fixing all the optical elements in thier final position.

Conventionally, when that a rotatable reflecting mirror is used in the finder optical system. the alignment of the finder optical elements axis is adjusted by rotating the reflecting mirror. In this situation , however, the position at which the mirror should be placed in order to overcome the parallax must be determined for every finder optical system.

Further, the mirror is then held in this position by screwing the mirror to a mounting bracket. In order to prevent the mirror from moving, it must be firmly screwed to the mounting bracket. However, by firmly screwing the mirror to the mounting bracket, the position of the mirror is slightly changed, and the parallax is not precisely compensated.

SUMMARY OF THE INVENTION

It is therefore an object of the present invention to provide a parallax compensation system for a finder optical system in which a mirror can be easily placed at a designated position and its position easily adjusted to compensate for a parallax error of the finder optical system.

According to one aspect of the present invention there is provided a parallax compensation system in a camera finder system. The parallax compensation system includes:

a reflecting device;

a mounting device, with the reflecting device rotatably mounted on the mounting means such that the reflecting device rotates about a predetermined axis;

a cam device, rotatably mounted on the mounting device, for contacting the reflecting device, the cam means having a device for regulating the reflecting device in a predetermined angular position; and an urging device for biasing the reflecting device to contact the cam member, wherein when the cam device is rotated, the reflecting device is rotated about the axis to be shifted from a predetermined angular position.

DESCRIPTION OF THE EMBODIMENTS

Figure 1:
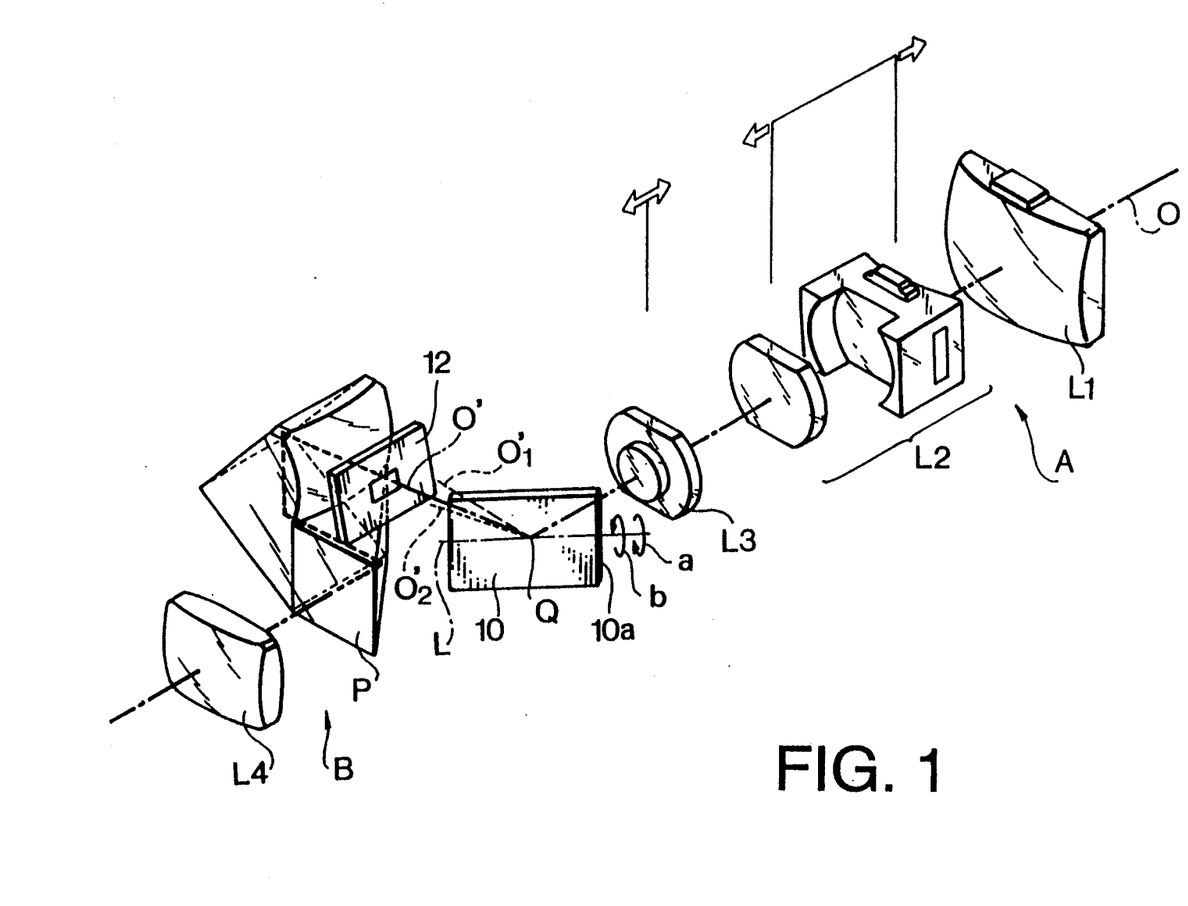
FIG. 1 shows an exploded perspective view of a parallax compensation system as employed in a finder optical system, embodying the invention.

FIG. 1 shows a real image type zoom finder optical system, to which a parallax compensation system embodying the invention is to be applied. Recently, zoom compact cameras employ a real image type finder optical system which has a high magnification ratio. In the real image finder system, an object image formed by a finder objective lens system is observed through an eye piece lens system.

The finder optical system illustrated consists of an objective lens system A, a reflecting mirror 10, and an eye piece lens system B.

The objective lens system A includes a first lens group L1, a second lens group L2 and a third lens group L3. The second lens group L2 and the third lens group L3 can move along an optical axis O of the objective lens system A, and can vary the magnification of the objective lens system A.

The eye piece lens system B includes a prism P, a field frame glass 12 and a lens group L4. The mirror 10 and the eye piece lens system B invert an inverted image produced by the objective lens system A, so that an erect image can be viewed through the lens group L4.

Light which is incident along optical axis O, is reflected by a reflecting surface 10a of the mirror 10, along an optical axis O'. The mirror 10 is arranged such that the angle of incidence along the optical axis O, is 45 degrees. Therefore, the optical axis O' is perpendicular to the optical axis O. As shown in FIG. 1, the mirror 10 is rotatable along an axis L in the directions a and b. If the mirror 10 is rotated in direction a, the optical axis of the reflected light shifts upwards as shown by $O'_1$. If the mirror 10 is rotated in direction b, the optical axis of the reflected light shifts downwards as shown by $O'_2$. The shifting of the optical axis in the vertical direction will adjust the vertical position of the real image formed by the objective lens A. As a result, the parallax caused by the assembled finder optical system, in the vertical direction, can be overcome.

Figure 2:
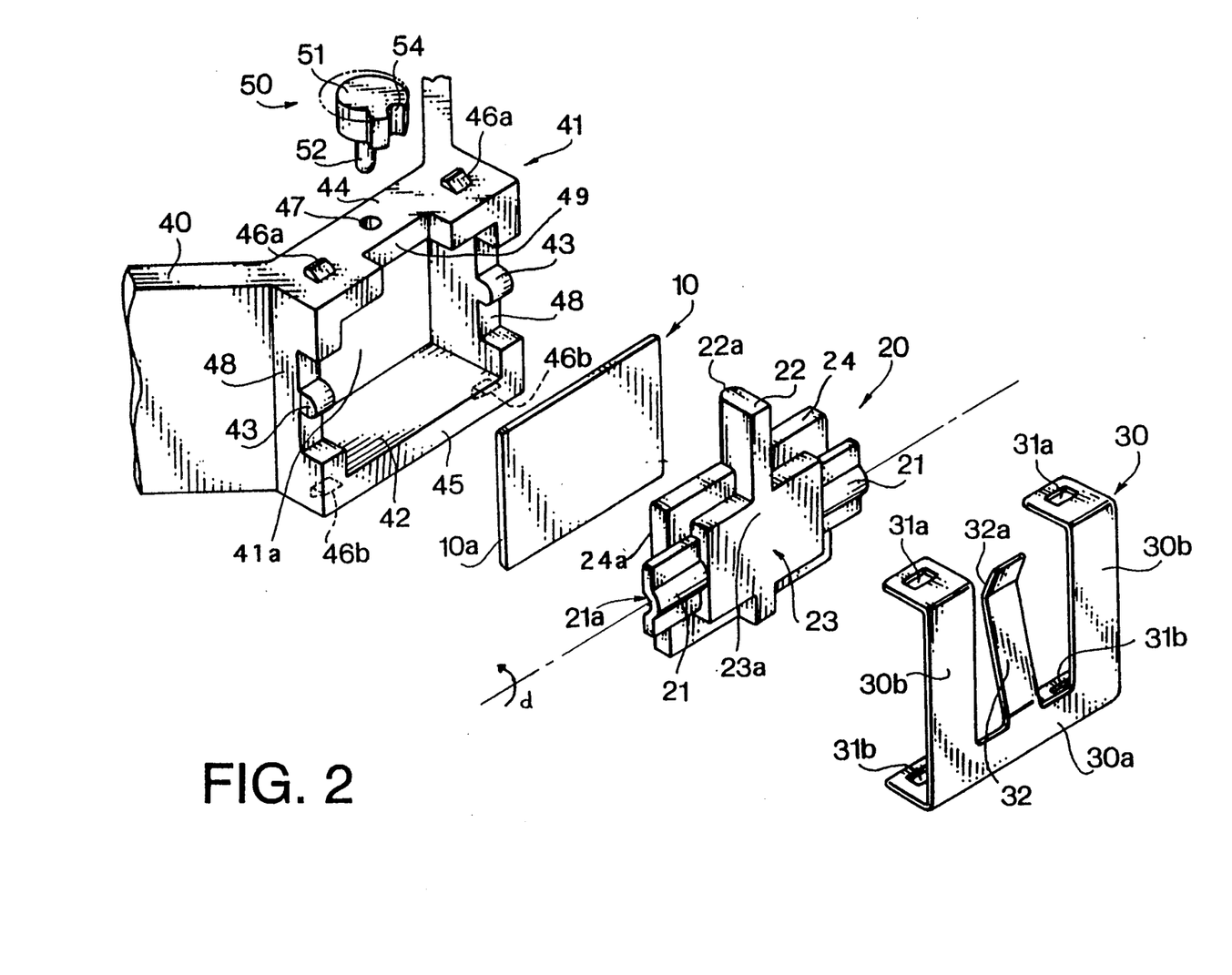
FIG. 2 shows an exploded perspective of the parallax compensation system.

FIG. 2 shows a mounting of the mirror 10 which ensures that the mirror 10 is properly positioned and that the proper position is maintained.

The mirror 10 is attached to a mounting member 20, by an adhesive. The mounting member 20 has a substantially rectangular shaped body 24. A front flat surface 24a of the body 24 has the mirror 10 mounted to it. A rearwardly stepped portion 23 is formed on the body 24. A pair of engaging arms 21, extend horizontally to the right and left, respectively, from the stepped portion 23, beyond the body 24. An engaging groove 21a, having a semi-circular cross-section, is formed in each engaging arm 21, extending horizontally. A protrusion 22, extends upwardly, (i.e., in a direction perpendicular to the direction along which the engaging grooves 21a extend. A front surface 22a of the protrusion 22 is rounded and has a predetermined semi-circular shape.

A pressing member 30 is made of a flexible material such as metal or resin. The pressing member 30, formed having a substantially E-shape, includes a horizontal portion 30a. A pair of arms 30b protrude vertically from the ends of the horizontal portion 30a. The upper and lower portions of the arms 30b are bent perpendicular to the arms 30b, and have engaging holes 31a and 31b formed thereon.

A flexible arm 32 protrudes from the center of the horizontal portion 30a and is bent towards the mounting member 20. The upper portion of the arm 32 has a joint 32a which contacts the rear surface 23a of the mounting member 20, and biases mounting member 20 to rotate in the direction of arrow d as shown in FIG. 2.

A case 40 has a mounting frame 41 formed with a rectangular opening 41a for placing the mirror 10 therein. The opening 41a has a rectangular rear surface 45. Each vertical side of the rectangular rear surface 45 is provided with a cut-out portion 48, while the top side of the rectangular rear surface 45 has a cut-out portion 49. In each cut-out portion 48, a protrusion 43 extending rearwardly, is provided at the vertical center thereof.

When the mounting member 20, carrying the mirror 10, is assembled to mounting frame 41, the pair of engaging grooves 21a contact the pair of protrusions 43, and front surface 22a of protrusion 22 is placed in the cut-out portion 49. The substantially semi-circular shaped protrusions 43 and substantially semi-circular shaped engaging grooves 21a are designed such that the engaging grooves 21a can smoothly slide about the protrusions 43. Further, the shapes of the engaging grooves 21a and the protrusions 43 are precisely determined so that the position of a reflecting point Q, along an axis the rotation L, does not change, even though the mounting member 20 is rotated. The reflecting point Q is the point at which the optical axis O is incident on the reflecting surface 10a.

The spaces formed between cut-out portions 48 and mounting member 20 allow the mounting member 20 to swing about the protrusions 43, in a predetermined range. This predetermined range is determined by the depth of the cut-out portions 48 and the length of the protrusions 43.

The space formed by the cut-out portion 48 receives the protrusion 22 of the mounting member 20, while allowing the mounting member 20 to swing.

The top surface 44 of the mounting frame 41 has engaging pawls 46a formed thereon, to engage the engaging holes 31a, described above. Similarly, engaging pawls 46b are formed on the bottom surface of the mounting frame 41, and fit into the engaging holes 31b. The top surface 44 has a hole 47 into which a shaft 52 of a compensation member 50, described below, is inserted.

The compensation member 50 further includes a cam member 51 having a cam surface 53 and a groove 54 formed therein. The groove 54 extends vertically and has a substantially semi-circular shaped cross-section corresponding to the rounded surface 22a of the protrusion 22 of the mirror mounting member 20. The shape and depth of the groove 54 is determined so that the reflecting mirror 10 is placed at a predetermined optimum position when the rounded front portion 22a of the protrusion 22 is received in the groove 54.

Figure 3:
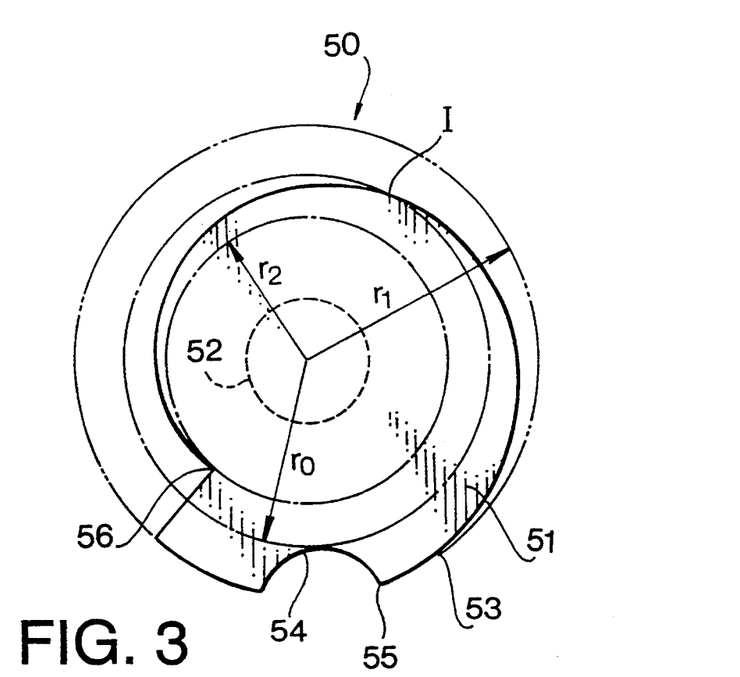
FIG. 3 shows a plan view of a compensation knob used with the parallax compensation system shown in FIG. 2.

The shaft 52 extends downwardly from the cam member 51 such that the compensation member 50, when assembled to the frame 41, will rotate eccentrically. As shown in FIG. 3, the radius of the cam surface 53 from the axis of rotation decreases from $r_1$ at a boundary edge 55, where the cam surface meets the groove 54, to $r_2$ at a boundary edge 56. The effective distance of the groove 54 from the axis of rotation is defined by radius $r_0$.

Further the radius $r_2$ is longer than a distance from the shaft 52 to the cut-out portion 49. Therefore, the rounded front surface 22a of the protrusion 22 of the mounting member 20, will always contact the cam surface 53, as the compensation member 50 is rotated about shaft 52. In other words, the rounded front surface 22a of the protrusion 22 of the mounting member 20 will never contact an inner surface of the cut-out portion 49. As also shown in FIG. 3, radius $r_1 > r_0 > r_2$.

The mounting and adjustment of the angle of the reflecting mirror 10 will be described.

Figure 4:
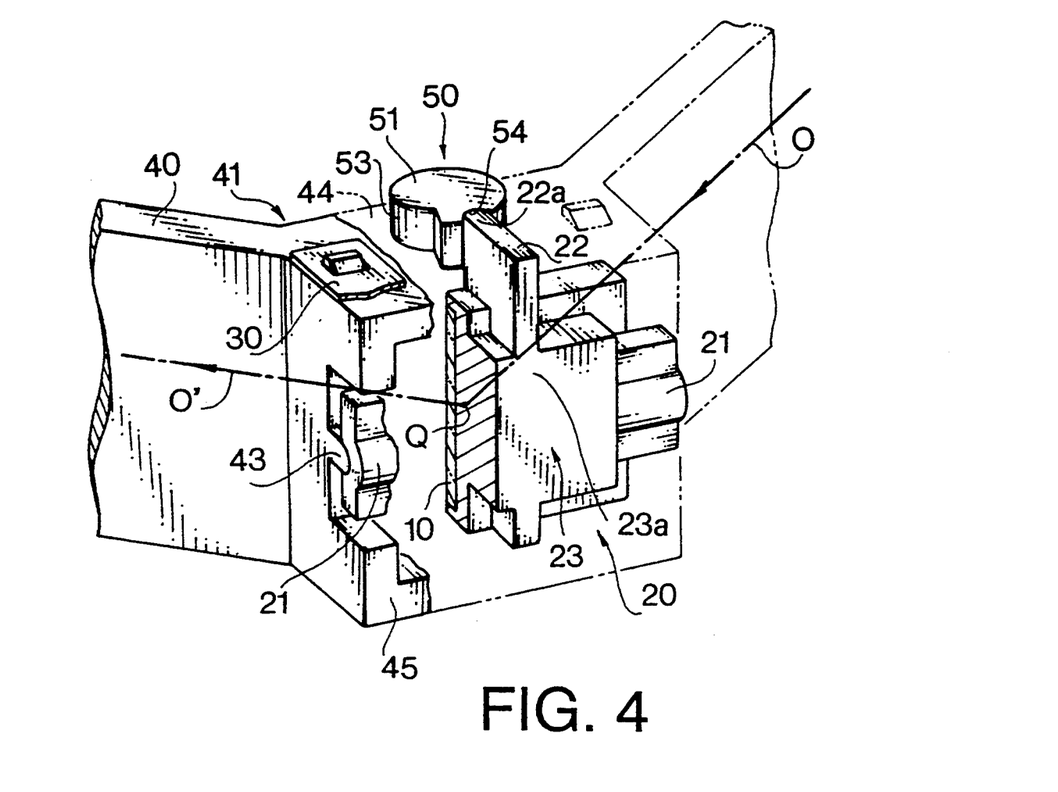
FIG. 4 shows the parallax compensation system of FIG. 2 aligned in a neutral position.

FIG. 4 shows the reflecting mirror 10 mounted to the mounting member 20, which is fitted to the mounting frame 41. Initially, the mounting member 20 is placed with the engaging grooves 21a contacting the protrusions 43 and the rounded front surface 22a of the mounting member 20 being positioned in the groove 54 of the compensating member 50 assembled to the frame 41 by inserting the shaft 52 into the hole 47. Then the pressing member 30 is fitted to the frame 41 by engaging the holes 31a, 31b with engaging pawls 46a, 46b for providing a biasing force which presses the rounded front surface 22a into the groove 54. This results in accurate positioning of the mirror 10 in a neutral position (i.e., a predetermined optimum position). In other words, positioning of the mirror mounting member 20 is regulated by protrusions 43, 43 and the groove 54 to which the engaging grooves 21a, 21a and rounded surface 22a of the mounting member 20 are abutted.

If, however, parallax is found in the finder optical system when the mirror mounting member 20 has been placed in its predetermined position, by manually rotating the compensation member 50 clockwise as shown in FIG. 3, the parallax can be overcome. That is, by rotating the compensation member 50, the portion of the cam surface 53 which contacts the protrusion 22 will be changed. This results in the protrusion 22 moving in a direction towards the front of the mounting member 41.

Figure 5:
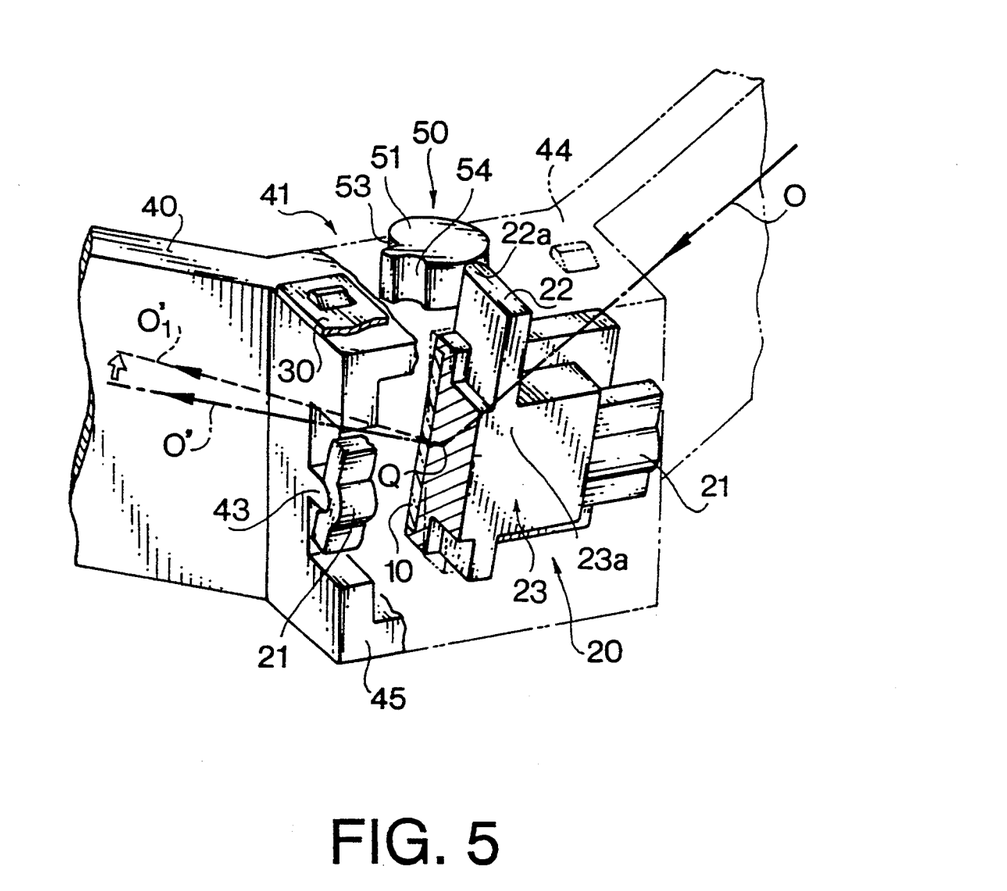
FIG. 5 shows the parallax compensation system of FIG. 2 aligned in a compensating position.

When the compensation mechanism 50 is first rotated, the front surface 22a of the protrusion 22 is moved out of contact with the groove 54, and into contact with the boundary edge 55. Thus, the protrusion 22 has been moved rearwards by a distance $r_1-r_0$. This results in the engaging arms 21 of the mounting member 20 being swung about the protrusions 43 of the mounting frame 41. The mirror 10 is thus swung about the axis L. The optical axis $O_1'$ of the reflected light is angled upwards with respect to the optical axis O of the incident light (see FIG. 5).

As the compensation mechanism 50 is further rotated in the clockwise direction, the radial distance of the cam surface 53 reduces, and thus, the angular rotation of the mirror 10 reduces. When the compensation member 50 has been rotated such that position I, as shown in FIG. 3, contacts the rounded front surface 22a of the protrusion 22, the radial distance of the cam surface 53 will be the same as radial distance of the groove 54, and the mirror 10 will again be at the neutral position.

Further rotation of the compensation member 50 in the clockwise direction, will decrease the radial distance of the cam surface 53. The elastic arm 32 of the pressing member 30 exerts a force on the upper rear surface 23a of the mounting member 20. This forces the protrusion 22 to positively contact the cam surface 53, regardless of the angular position of the compensation member 50. Thus, as the compensation member 50 is further rotated in the clockwise direction, the cam surface 53 will be at a radial distance that is less than $r_0$. The protrusion 22 will be forced forward of the neutral position by the biasing force of the pressing member 30, and the mirror 10 will be angled downwards with respect to the optical axis O of the incident light.

Therefore by rotating the compensation member 50, the angle of the mirror 10, with respect to the vertical plane, can be adjusted. Further, since the cam surface 53 is continuous, the angle of rotation of the mirror 10 can be continuously varied. Thus, the compensation member 50 is rotated until the desired angle of rotation of the mirror 10 has been determined. Then the compensation member 50 can be secured by adhesive at its rotated position. For instance, while the compensation member 50 is being held in the desired position, a quick bonding adhesive can be applied to an area where a lower surface of the compensation member 50 contacts the top surface 44 of the mounting frame 41.

The mirror 10 will remain at its desired angle of rotation, without any force being applied to the reflecting surface of the mirror 10. Thus, accurate parallax compensation can be achieved. In the illustrated zoom finder optical system, adjustment of the parallax may be made when the zoom lens is positioned at its telephoto extremity.

In the above description, the compensation member 50 is rotated manually to achieve the desired angle of rotation. If a groove is formed in an upper surface of the compensation member 50, a screwdriver could be used to rotate the compensation member 50.

As described above, when the mounting member 20 is mounted to the mounting frame 41 with the protrusion 22 received in the groove 54 while the engaging grooves 21a abut protrusions 43, and a biasing force is applied by pressing member 30, the mirror 10 will be aligned in a predetermined optimum position. However, since it is possible that other components of the finder optical system, such as the objective lens system may be slightly misaligned as a result of manufacturing tolerances etc., the angle of the mirror 10 must be adjusted to overcome any parallax error that may be present.

In the above description, the mirror 10 rotates about a horizontal axis L in order to compensate for vertical parallax errors. However it is possible to have mirror 10 rotate about a vertical axis, thereby compensating for horizontal parallax errors.

Parallax compensation for a zoom finder used in a compact camera has been illustrated in this description. However, the parallax compensation may be applied to any finder used with a camera where the finder optical axis is different from the photographing optical axis.

The present disclosure relates to subject matter contained in Japanese Utility Model Application HEI 5-022676, filed on Apr. 28, 1993, which is incorporated in its entirety by reference herein.

What is claimed is:

1. A parallax compensation system in a camera finder system, said parallax compensation system comprising:
   reflecting means;
   mounting means, said reflecting means rotatably mounted on said mounting means such that said reflecting means rotates about a predetermined axis;
   a cam member rotatably mounted on said mounting means, for contacting a portion of said reflecting means, said cam member having means for regulating said reflecting means in a predetermined angular position; and
   urging means for biasing said reflecting means so that said portion of said reflecting means contacts said cam member,
   wherein rotation of said cam member causes rotation of said reflecting means about said predetermined axis and shifting of said reflecting means from said predetermined angular position.

2. The parallax compensation system according to claim 1, wherein said reflecting means comprises:
   a reflecting mirror;
   a mounting member, said reflecting mirror being attached to said mounting member; and
   a pair of engaging arms provided on said mounting member and extending along said axis, one of said engaging arms extending in an opposite direction with respect to the other of said engaging arms;
   an engaging protrusion, said engaging protrusion extending perpendicular to said axis, said engaging protrusion contacting said cam member.

3. The parallax compensation system according to claim 2, wherein said cam member comprises a cam surface, said engaging protrusion contacting said cam surface;, wherein a regulating means comprises a groove formed in said cam surface, said groove extending in a direction parallel to a direction in which said engaging protrusion is extending,
   wherein when said reflecting means is mounted on said mounting means and said engaging protrusion is received in said groove, said reflecting means is aligned in said predetermined angular position, and
   wherein when said engaging protrusion contacts said cam surface, said engaging protrusion is moved along a circumferential path which has said axis at the center thereof.

4. The parallax compensation system according to claim 3 wherein said cam member further comprises a shaft, said shaft inserted into said mounting means; wherein when said cam member is rotated, a radial distance of said cam surface from said shaft continuously changes; wherein as said radial distance of said cam surface from said shaft changes, a distance of said engaging protrusion from said cam shaft continuously changes, whereby said engaging protrusion moves along said circumferential path, said shaft extending perpendicular to said radial distance.

5. The parallax compensation system according to claim 2 wherein said mounting means comprises:
   a mounting frame, said mounting frame comprising a rectangular rear surface having a pair of vertical sections, each of said vertical sections comprising a vertical cut-out portion, and a protrusion formed in said vertical cut-out portion, said protrusion having a semi-circular shape; and
   wherein each of said engaging arms of said mounting member has a groove formed therein, said grooves contacting said protrusions formed in said vertical cut-out portions of said rectangular rear surface of said mounting frame.

6. The parallax compensation system according to claim 5 wherein said grooves formed in said engaging arms have a cross-section such that when said engaging arms are rotated about said protrusions, said axis of rotation remains unchanged.

7. The parallax compensation system according to claim 1, wherein said reflecting means comprises:
a reflecting mirror;
a mounting member; and
said portion of said reflecting means comprising an engaging protrusion, said reflecting mirror attached to said mounting member, and said engaging protrusion integrally formed to said mounting member;
wherein said mounting means comprises a mounting frame and a pressing member,
wherein said cam member comprises a cam surface and a groove formed in said cam surface; and
wherein said mounting member is rotatably mounted to said mounting frame, such that said mounting member rotates about said axis, and said pressing member biases said mounting member towards said cam member such that said engaging protrusion contacts said cam surface.

8. The parallax compensation system according to claim 7 wherein said mounting frame comprises:
a rectangular rear surface having a pair of vertical sections, each of said vertical sections comprising a vertical cut-out portion, and a protrusion formed in said cut-out portion; and
an opening for receiving said reflecting means, said reflecting surface receiving light incident along an optical axis through said opening;
wherein said mounting frame further comprises a top section having a top cut-out portion;
wherein said mounting member is rectangular shaped and comprises an arm formed on each vertical side thereof, each of said arms having a groove formed therein, said grooves contacting said protrusions formed in said vertical cut-out portions of said rectangular rear surface of said mounting frame; and
wherein said pressing member comprises an elastic arm bent towards said cam member, said elastic arm biasing said mounting member such that a front surface of said engaging protrusion is received in said top cut-out portion and contacts said groove of said cam surface.

9. The parallax compensation system according to claim 8 wherein said mounting frame further comprises:
a top surface, said top surface having a first pair of engaging pawls formed thereon; and
a bottom surface, said bottom surface having a second pair of engaging pawls formed thereon;
wherein said urging means further comprises a pair of mounting arms, each of said mounting arms having a bent portion at each end thereof, said bent portions having an engaging hole formed therein; and
wherein said urging means is attached to said mounting frame by said engaging pawls engaging said engaging holes.

10. The parallax compensation system according to claim 1 wherein when said cam member is rotated to a fixing position such that said reflecting means is shifted to a desired angular position, said cam member being fixed at said fixing position by adhesive.

11. The parallax compensation system according to claim 10 wherein said adhesive is a quick bonding adhesive.

12. The parallax compensation system according to claim 1 wherein said reflecting means comprises a reflecting surface, and wherein said predetermined axis comprises a line which is formed by an intersection of a plane defined by said reflecting mirror and a plane defined by an incident light optical path and a reflecting light optical path.

13. The parallax compensation system according to claim 1 wherein said predetermined angular position is a optimum designed position.

14. A parallax compensation system according to claim 1, wherein said cam member further comprises:
a cam surface extending circumferentially around said cam member and eccentrically with respect to an axis of rotation of said cam member, wherein said cam surface contacts said portion of said reflecting means for adjustment of said reflecting means.

15. A parallax compensation system according to claim 14, wherein said cam member further comprises:
a groove formed in said cam surface and extending radially inwardly from said cam surface, wherein said groove contacts said portion of said reflecting means for positioning said reflecting means in said predetermined angular position.

16. A parallax compensation system according to claim 15, wherein said groove comprises a semi-circular cross section.

17. A parallax compensation system according to claim 15, wherein said cam member further comprises:
a stop adjacent said groove, said stop defining a boundary edge beyond which said cam member cannot be rotated, wherein said cam surface extends from a side of said groove opposite a side of said groove which is adjacent said stop, to said boundary edge, said cam surface being radially more distant from said axis of rotation of said cam member than said groove at a location where said groove and said cam surface meet, and said cam surface continuously decreasing in radial distance from said axis of rotation of said cam member, between said opposite side of said groove and said boundary edge, so that said cam surface is radially less distant from said axis of rotation of said cam member than said groove at a location where said cam surface and said boundary edge meet, wherein said cam surface allows adjustability of said reflecting means within a predetermined design tolerance range.

18. A parallax compensation system according to claim 17, wherein rotation of said cam member from a position wherein said groove contacts said portion of said reflecting means, along said cam surface toward said boundary edge, initially causes an optical axis of light reflected from said reflecting means to shift in a first direction from a predetermined orientation, and with continuing rotation toward said boundary edge, said optical axis shifts back toward said predetermined orientation and then in a second direction opposite said first direction from said predetermined orientation.

19. A parallax compensation system according to claim 1, wherein rotation of said cam member initially causes an optical axis of light reflected from said reflecting means to shift in a first direction from a predetermined orientation, and with continuing rotation, said optical axis shifts back toward said predetermined orientation and then in a second direction opposite said first direction from said predetermined orientation.

20. A parallax compensation system in a camera finder system, said parallax compensation system comprising:

a reflecting member;

a mounting frame about which said reflecting member is rotatably mounted, so that said reflecting member rotates about a predetermined axis;

a compensation mechanism rotatably mounted on said mounting frame, for contacting a portion of said reflecting member, for regulating said reflecting member in a predetermined angular position;

wherein rotation of said compensation mechanism causes rotation of said reflecting member about said axis and shifting of said reflecting member from said predetermined angular position wherein said compensation mechanism comprises:

a cam surface extending circumferentially around said compensation mechanism and eccentrically with respect to an axis of rotation of said compensation mechanism for adjustment of said reflecting member, wherein said cam surface contacts said portion of said reflecting means.

21. A parallax compensation system according to claim 20, wherein rotation of said cam member initially causes an optical axis of light reflected from said reflecting member to shift in a first direction from a predetermined orientation, and with continuing rotation, said optical axis shifts back toward said predetermined orientation and then in a second direction opposite said first direction from said predetermined orientation.

22. A parallax compensation system according to claim 20, wherein said compensation mechanism further comprises:

a groove formed in said cam surface and extending radially inwardly from said cam surface, wherein said groove contacts said portion of said reflecting member for positioning said reflecting means in said predetermined angular position.

23. A parallax compensation system according to claim 22, wherein said groove comprises a semi-circular cross section.

24. A parallax compensation system according to claim 22, wherein said compensation mechanism member further comprises:

a stop adjacent said groove, said stop defining a boundary edge beyond which said compensation mechanism cannot be rotated, wherein said cam surface extends from a side of said groove opposite a side of said groove which is adjacent said stop, to said boundary edge, said cam surface being radially more distant from said axis of rotation of said compensation mechanism that said groove at a location where said groove and said cam surface meet, and said cam surface continuously decreasing in radial distance from said axis of rotation of said compensation mechanism, between said opposite side of said groove and said boundary edge, so that said cam surface is radially less distant from said axis of rotation of said compensation mechanism that said groove at a location where said cam surface and said boundary edge meet, wherein said cam surface allows adjustability of said reflecting member within a predetermined design tolerance range.

25. A parallax compensation system according to claim 24, wherein rotation of said compensation mechanism from a position wherein said groove contacts said portion of said reflecting member, along said cam surface toward said boundary edge, initially causes an optical axis of light reflected from said reflecting member to shift in a first direction from a predetermined orientation, and with continuing rotation toward said boundary edge, said optical axis shifts back toward said predetermined orientation and then in a second direction opposite said first direction from said predetermined orientation.

* * * * *

UNITED STATES PATENT AND TRADEMARK OFFICE
CERTIFICATE OF CORRECTION

PATENT NO. : 5,452,034
DATED : September 19, 1995
INVENTOR(S) : Y. Ichikawa, et. al.

It is certified that error appears in the above-indentified patent and that said Letters Patent is hereby corrected as shown below:

```
Title page, item [54] and col. 1, line 1, before "REGULATED" insert --CAM--.
Column 6, line 33, change "surface;," to --surface,--.
Column 8, line 13, change "a" to --an--.
```

Signed and Sealed this

Fourteenth Day of January, 1997

Attest:

Attesting Officer

BRUCE LEHMAN
Commissioner of Patents and Trademarks